April 29, 1969   G. B. BARTON   3,440,702

METHOD OF ASSEMBLING SPECTACLE FRAMES

Filed March 1, 1967

INVENTOR
George Bernard Barton
by Stowell & Stowell
Attorneys

United States Patent Office 3,440,702
Patented Apr. 29, 1969

3,440,702
METHOD OF ASSEMBLING SPECTACLE FRAMES
George B. Barton, Aylesbury, England, assignor to Merx Optical Company Limited, London, England, a British company
Filed Mar. 1, 1967, Ser. No. 619,666
Claims priority, application Great Britain, Mar. 3, 1966, 9,462/66
Int. Cl. B21d 53/00
U.S. Cl. 29—20                                     14 Claims

ABSTRACT OF THE DISCLOSURE

A metal pin is attached to a metal reinforcing core member in a plastic spectacle frame. A recess is formed in the frame to the depth of the core. The pin is placed in the recess, touching the core, and a current passed between them.

---

The present invention relates to spectacle frames and more particularly to an improved method of attaching a pin to the metal reinforcing core in a plastics spectacle frame portion.

The two side arms of a spectacle frame are hinged to the front of the frame, and, in normal everyday use the hinges on the frame are subjected to considerable strain. At the same time, fashion, at present, dictates that the external appearance of both the front and the side arms of the frame is plain and unbroken. The hinge plates must, therefore, be attached to the inside surface of the side arms of the frame in such a manner that the means of attachment is not visible on the outside surface while being sufficiently strong to withstand the substantial strain imposed upon the hinge joint in normal use.

Hitherto, it has been the practice to form the hinge plate integrally with the reinforcing core and then mould or laminate the plastics material around the integral core and hinge plate. This known method, while producing a strong connection between the core and the hinge plate, has the disadvantage that a different mould must be made for every required length of side arm, and considerable stocks of finished side arms of every required length must be maintained to meet demand.

It is an object of the present invention to provide a method of attaching a pin for a hinge plate to a side arm of a spectacle frame which ensures a strong, but hidden connection between the hinge plate and the arm and which, in addition, enables side arms of different lengths to be made up from stock of a given standard length thus substantially reducing tooling and stocking costs.

According to the invention, there is provided a method of attaching a metal pin to a metal reinforcing core in a plastics spectacle frame portion comprising the steps of forming a recess in the plastics frame portion to the depth of the core, placing the pin in the recess and passing a current through the pin so as to heat the pin and the core sufficiently to join the pin to the core.

According to a further aspect of the invention there is also provided a method of attaching a hinge plate to a plastics side arm of a spectacle frame having a metal core, comprising the steps of cutting the arm to the required length, forming two spaced bores in the arm to the depth of the core, placing a metal pin in each bore and in electrical contact with the core, passing a current through the two pins and the core to heat the pins and the core sufficiently to join the pins to the core, and attaching the hinge plate to the projecting ends of the pins.

According to yet a further aspect of the invention there is provided a method of attaching a hinge plate to a plastics side arm of a spectacle frame having a metal core, comprising the steps of joining two pins by a current conducting bridge, cutting the arm to the required length, forming a recess in the arm to the depth of the core, placing the integral pins and bridge in the recess in heat conductive relationship with the core, passing a current through one pin, across the bridge and through the other pin to heat the pins and the bridge and, by conduction, the core sufficiently to join the pins and the bridge to the core and attaching a hinge plate to the projecting ends of the pins.

Preferred forms of the invention will now be described with reference to the accompanying drawings, in which.

Figure 1:
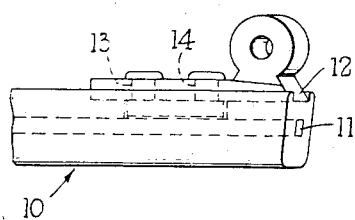
FIG. 1 is an elevation of the end of a made up spectacle frame side arm.

In FIG. 1 an end of a side arm of a spectacle frame is indicated generally at 10.

The side arm 10 is formed from a synthetic plastics material such as a cellulose acetate or a cellulose nitrate and strengthened by a wire core 11, which is preferably a nickel silver alloy but may be any suitable metal which is readily welded or brazed.

The core 11 is embedded in the synthetic plastics material by any known and convenient method, for instance by laminating the wire core between two layers of the plastics material or by moulding the synthetic plastics to the desired shape and then forcing the core 11 under heat and pressure into the synthetic plastics.

At the end of the arm 10 which is to be hinged to the front of the spectacle frame a metal hinge plate 12 is partially recessed in and secured to the side arm 10 by two pins 13, 14, both of which are preferably made from the same alloy as the wire core 11 but which may also be made from any metal which is readily welded or brazed to the wire core.

In order to attach the plate 12 to the arm 10, the arm 10, which is a standard size, is taken from stock and cut to the required length. A recess 15 is then formed in the inside surface of the arm, the recess comprising an outer portion 16, which partially accommodates the depth of the hinge plate 12, and an inner portion 17 which extends down to the core 11.

The pins 13 and 14 are joined integrally to a bridge plate 20, which is formed from the same material as the pins and acts as a current conducting bridge between the pins. The inner portion 17 of the recess 15 is shaped to receive the bridge plate 20 and has a depth approximately equal to the depth of the bridge plate.

After forming the recess 15 in the arm 10 the core wire 11 in the bottom of the inner portion 17 of the recess is covered with a layer of brazing alloy 21, preferably a silver alloy, and a liquid flux 22 and the bridge plate 20, carrying the pins 13 and 14 is placed on top of the flux. A pair of electrodes 23 and 24 are then brought down on to the rivets and a current of 1250–1350 amps. at a frequency of 50 c./s. and about 3.5 to 4 volts is then passed through one of the pins, along the bridge plate 20 and through the other pin for a sufficient time, for example 7–8 cycles of the current, i.e. 0.14 to 0.16 second, to generate sufficient heat in the bridge plate 20 by conduction to braze the bridge plate 20 to the wire core 11.

In order to hold the bridge plate 20 firmly against the wire core 11 while the current is flowing air pressure of approximately 20 p.s.i. is applied to the bridge plate. The current does not at any time flow through the wire core 11, which is heated conductively by the bridge plate 20.

The hinge plate 12 which is formed with two suitably positioned apertures, is then placed over the projecting ends of the pins, which are turned over, or staked, so as to attach the hinge plate securely to the side arm 10.

If desired the use of a flux and a brazing alloy can be omitted and the bridge plate 20 welded directly on to the wire core 11.

Figure 3:
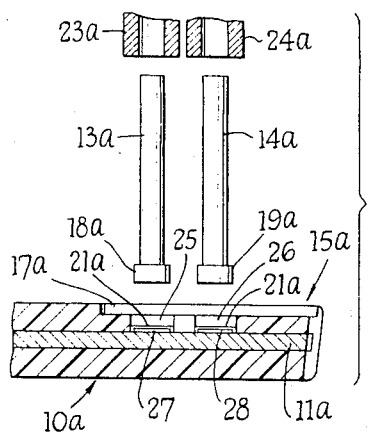
FIG. 3 is a view similar to FIG. 2 illustrating a further embodiment of the invention.
Figure 2:
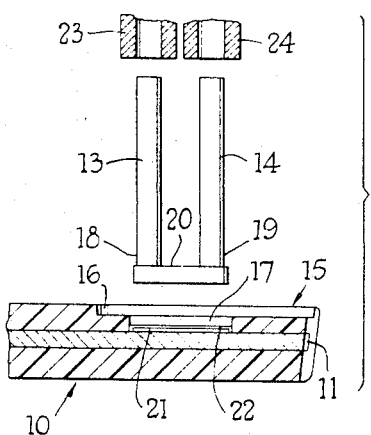
FIG. 2 is a horizontal section through the side arm of FIG. 1 on an enlarged scale and showing also the rivet pins for a hinge plate prior to their attachment to the arm.

In an alternative method according to the invention of attaching the pins to the side arm, which is illustrated in FIGURE 3, the side arm 10a is formed with a recess 15a having an outer portion 17a and an inner portion comprising two spaced bores 25 and 26. The rivets 13a, 14a are not joined together but are provided with enlarged heads 18a and 19a and the outer portion 17a of the recess 15a is sunk to such a depth in the arm 10a that the depth of synthetic plastics material remaining between the bottom of the recess and the core 11a is approximately equal to the depth of the rivet heads.

A liquid flux 21a and pellets 27 and 28 of brazing alloy are placed in the bores 25 and 26 and a pin is placed in each bore with the head of the pin in contact with the flux and alloy. The diameter of the bores 25 and 26 are such that the heads of the pins are a close fit therein.

An electrode 23a, 24a is then brought down onto each pin so as to contact the head of the rivet and a current of approximately 1200 amps. at a frequency of 50 c./s. and about 3.5 to 4 volts is passed through one of the pins, along the wire core 11a and through the other pin for a sufficient time (for example 3–4 cycles of the current, i.e., .06–.08 second) to generate the heat necessary to braze the two pins to the core 11. In order to hold the heads of the pins firmly in contact with the brazing alloy while the current is flowing air pressure of approximately 20 p.s.i. is applied to each pin.

The hinge plate 12 is then attached to the projecting ends of the pins in the manner described above.

In the embodiment of FIGURE 3 the depth of the outer portion 17a of the recess 15a is such that the heads 18a, 19a of the pins are flush with the bottom of the outer portion 17a of the recess so as to enable the maximum diameter electrode to be placed over each pin without the electrode coming into contact with the plastics material. It will be seen that, with this arrangement the diameter of the electrode is limited, not by the diameter of the bore 25 or 26 but by the spacing of the two pins.

The recess in the side arm may comprise two bores but, in this event, the electrodes placed over the pins are preferably of slightly smaller diameter than the heads of the pins so that there is at all times a small air gap between each electrode and the wall of the bore. This ensures that the plastics material of the side arm is not discoloured to any significant extent by the heat from the electrodes.

The use of a brazing alloy is not essential and the pins can be welded directly into the wire core if required.

It has been found, in practice, that the above described methods of attaching a hinge plate to a side arm of a spectacle frame provides a very secure attachment which leaves no mark on the outer surface of the arm.

The heat generated during the welding or brazing operation is not sufficient to discolour the synthetic plastics material or not to an extent which is visible on the external surface of the arm.

The above described methods also have the considerable commercial advantage that side arms of a single standard length can be manufactured in bulk and the standard length taken from stock and cut to size according to demand before the hinge plate is attached. This reduces the necessity to manufacture and stock large quantities of many different lengths of made-up side arms, and also eliminates the necessity for a pair of moulds, that is a right hand and left hand mould, for each required arm length which results in a considerable saving in tooling costs.

Figure 5:
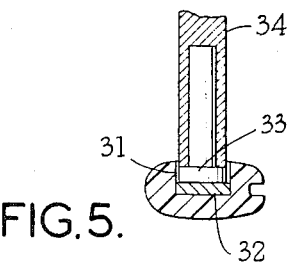
Figure 4:
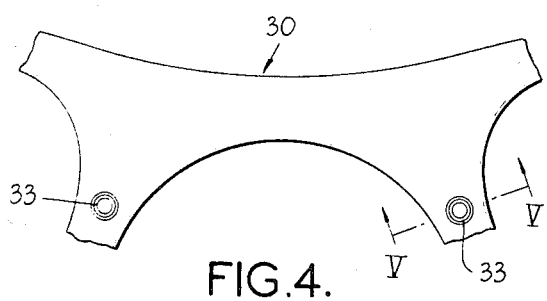
FIG. 4 is an inside elevation of the bridge portion of a spectacle frame and, FIG. 5 is a section on the line V—V of FIG. 4.

The method of the present invention may also be used to attach other components to a spectacle frame, as shown in FIGURES 4 and 5.

In FIGURES 4 and 5 the nose portion of a spectacle frame is indicated generally at 30. If it is desired to attach a nose pad, not shown, securely to the frame, this can be done quickly and efficiently by forming a bore 31 to the depth of the metal core 32 placing a headed pin 33 in the bore in electrical contact with the core applying an electrode 34 to the pin 33 and passing a current through the pin along the core 32 to a contact point, not shown, on the core which is spaced from the pin to weld the pin to the core.

A brazing alloy and a liquid flux may also be used if required so as to braze the pin 33 to the core 32 and the electrode is preferably of a diameter such that a small air gap is left between the electrode and the wall of the bore 31 to ensure that the electrode does not heat and discolour the plastics material.

When the pin 33 is welded or brazed to the core 32, the nose pad is attached in any convenient manner to the projecting end of the pin.

It will be appreciated that the method of the present invention may be used to attach a pin to the wire core of any portion of a spectacle frame and that the pin may then be used to attach any component to the frame, not necessarily being limited to the attachment of a hinge plate or nose pad.

Further modifications may be made to the embodiment illustrated in the accompanying drawings without departing from the spirit and scope of the invention which is defined in the following claims.

What I claim is:

1. A method of attaching a metal pin to a metal reinforcing core in a plastics spectacle frame portion comprising the steps of forming a recess in the plastics frame portion to the depth of the core, placing the pin in the recess and passing a current through the pin so as to heat the pin and the core sufficiently to join the pin to the core.

2. A method as claimed in claim 1, wherein the recess comprises a bore adapted to receive the pin and the pin is placed in the bore in electrical contact with the core and the current is passed through the pin and the core to a contact spaced along the core from the pin.

3. A method as claimed in claim 2, including the step of placing a flux material and a brazing alloy between the pin and the core prior to applying the current.

4. A method of attaching a hinge plate to a plastics side arm of a spectacle frame having a metal core, comprising the steps of cutting the arm to the required length, forming two spaced bores in the arm to the depth of the core, placing a metal pin in each bore and in elecrtical contact with the core, passing a current through the two pins and the core to heat the pins and the core sufficiently to join the pins to the core and attaching the hinge plate to the projecting ends of the pins.

5. A method as claimed in claim 4 and including the steps of placing a flux material and a brazing alloy between each pin and the core prior to applying the current.

6. A method as claimed in claim 5, wherein the hinge plate is partially or wholly seated in a complementarily shaped portion of the recess in the side arm.

7. A method as claimed in claim 6 wherein the hinge plate is placed over the projecting ends of the pins with the pins extending through apertures in the hinge plate and the ends of the pins are turned over to attach the hinge plate to the side arm.

8. A method as claimed in claim 7 wherein each pin has a cylindrical head portion, which is placed in the respective bore, and a cylindrical shank portion of smaller diameter than the head portion, which projects from the bore.

9. A method as claimed in claim 7, wherein the current is applied though two electrodes which are placed in contact with the pins and wherein an air gap is maintained at all times between the electrodes and the plastics material of the side arm.

10. A method of attaching a hinge plate to a plastics side arm of a spectacle frame having a metal core, comprising the steps of joining two metal pins by a current conducting bridge, cutting the arm to the required length, forming a recess in the arm to the depth of the core, placing the integral pins and bridge in the recess in heat conductive relationship with the core, passing a current through one pin, across the bridge and through the other pin to heat the pins and the bridge and, by conduction, the core sufficiently to join the pins and the bridge to the core and attaching a hinge plate to the projecting ends of the pins.

11. A method as claimed in claim 10 and including the step of placing a layer of flux material and a brazing alloy between the core and the bridge.

12. A method as claimed in claim 11 wherein the bridge comprises a metal plate and the pins are attached to the bridge plate.

13. A method as claimed in claim 12, wherein the hinge plate is placed over the projecting ends of the pins with the pins extending through apertures in the hinge plate and the ends of the pins are turned over to attach the hinge plate to the side arm.

14. A method as claimed in claim 13, wherein the hinge plate is partially or wholly seated in a complementary shaped portion of the recess in the side arm.

References Cited

UNITED STATES PATENTS 3,266,119   8/1966   Thorn _____ 29—20

RICHARD H. EANES, JR., *Primary Examiner.*